United States Patent
Yura et al.

(10) Patent No.: US 11,211,599 B2
(45) Date of Patent: Dec. 28, 2021

(54) LITHIUM COMPOSITE OXIDE SINTERED BODY PLATE

(71) Applicant: NGK INSULATORS, LTD., Nagoya (JP)

(72) Inventors: Yukinobu Yura, Nagoya (JP); Shigeki Okada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 193 days.

(21) Appl. No.: 16/531,420

(22) Filed: Aug. 5, 2019

(65) Prior Publication Data

US 2019/0355970 A1  Nov. 21, 2019

Related U.S. Application Data

(63) Continuation of application No. PCT/JP2018/004465, filed on Feb. 8, 2018.

(30) Foreign Application Priority Data

Feb. 13, 2017  (JP) .............................. JP2017-024345
May 22, 2017  (JP) .............................. JP2017-101079
(Continued)

(51) Int. Cl.
*H01M 4/00* (2006.01)
*H01M 4/131* (2010.01)
(Continued)

(52) U.S. Cl.
CPC .............. *H01M 4/131* (2013.01); *C04B 35/01* (2013.01); *H01M 4/0404* (2013.01);
(Continued)

(58) Field of Classification Search
CPC .. H01M 4/131; H01M 4/0404; H01M 4/0471; H01M 4/364; H01M 4/505;
(Continued)

(56) References Cited

U.S. PATENT DOCUMENTS

2012/0009470 A1* 1/2012 Sugiura ................. H01M 4/505
                                                      429/211
2012/0009471 A1   1/2012 Sugiura et al.
(Continued)

FOREIGN PATENT DOCUMENTS

EP      2 400 582 A1     12/2011
EP      3 540 843 A1      9/2019
(Continued)

OTHER PUBLICATIONS

Extended European Search Report (Application No. 18751079.7) dated Oct. 23, 2020.
(Continued)

*Primary Examiner* — Nicholas P D'Aniello
(74) *Attorney, Agent, or Firm* — Burr & Brown, PLLC

(57) ABSTRACT

Provided is a lithium complex oxide sintered plate for use in a positive electrode of a lithium secondary battery. The lithium complex oxide sintered plate has a structure in which a plurality of primary grains having a layered rock-salt structure are bonded, and has a porosity of 3 to 40%, a mean pore diameter of 15 μm or less, an open porosity of 70% or more, and a thickness of 15 to 200 μm. The plurality of primary grains has a primary grain diameter, i.e., a mean diameter of the primary grains, of 20 μm or less and a mean tilt angle of more than 0° to 30° or less. The mean tilt angle is a mean value of the angles defined by the (003) planes of the primary grains and the plate face of the lithium complex oxide sintered plate.

5 Claims, 1 Drawing Sheet

(30) Foreign Application Priority Data

Dec. 20, 2017 (JP) .............................. JP2017-244183
Jan. 19, 2018 (WO) .................. PCT/JP2018/001619

(51) Int. Cl.
| | |
|---|---|
| *C04B 35/01* | (2006.01) |
| *H01M 4/04* | (2006.01) |
| *H01M 4/36* | (2006.01) |
| *H01M 4/505* | (2010.01) |
| *H01M 4/525* | (2010.01) |
| *H01M 10/04* | (2006.01) |
| *H01M 10/0525* | (2010.01) |
| *H01M 4/02* | (2006.01) |

(52) U.S. Cl.
CPC ......... *H01M 4/0471* (2013.01); *H01M 4/364* (2013.01); *H01M 4/505* (2013.01); *H01M 4/525* (2013.01); *H01M 10/0436* (2013.01); *H01M 10/0525* (2013.01); *H01M 2004/021* (2013.01)

(58) Field of Classification Search
CPC .............. H01M 4/525; H01M 10/0436; H01M 10/0525; H01M 2004/021; H01M 10/052; H01M 2004/028; C04B 35/01; C04B 38/02; C04B 2235/785; C04B 2235/786; C04B 2235/787; C04B 2111/00853; C04B 35/62218; C04B 2235/6562; C04B 2235/6567; C04B 2235/661; C04B 2235/6587; C04B 2235/77; C04B 2235/6025; C04B 2235/3203; C04B 2235/3275; Y02E 60/10
See application file for complete search history.

(56) References Cited

U.S. PATENT DOCUMENTS

| | | | |
|---|---|---|---|
| 2012/0256337 A1* | 10/2012 | Yokoyama | ............ C01G 53/42 264/15 |
| 2016/0211506 A1 | 7/2016 | Yura et al. | |

FOREIGN PATENT DOCUMENTS

| | | |
|---|---|---|
| EP | 3 709 423 A1 | 9/2020 |
| EP | 3 709 430 A1 | 9/2020 |
| JP | 2012-9194 A | 1/2012 |
| JP | 2013-247022 A | 12/2013 |
| JP | 5587052 B | 8/2014 |
| JP | 5703409 B | 2/2015 |
| JP | 5752303 B | 5/2015 |
| WO | 2016/052176 A1 | 4/2016 |

OTHER PUBLICATIONS

International Search Report and Written Opinion (Application No. PCT/JP2018/004465) dated Apr. 10, 2018 (with English translation), 10 pages.

* cited by examiner

LITHIUM COMPOSITE OXIDE SINTERED BODY PLATE

CROSS-REFERENCE TO RELATED APPLICATIONS

This application is a continuation application of PCT/JP2018/004465 filed Feb. 8, 2018, which claims priority to Japanese Patent Application No. 2017-024345 filed Feb. 13, 2017, Japanese Patent Application No. 2017-101079 filed May 22, 2017, Japanese Patent Application No. 2017-244183 filed Dec. 20, 2017, and PCT/JP2018/001619 filed Jan. 19, 2018, the entire contents all of which are incorporated herein by reference.

BACKGROUND OF THE INVENTION

1. Field of the Invention

The present invention relates to a lithium complex oxide sintered plate for use in in a positive electrode of a lithium secondary battery.

2. Description of the Related Art

Powder-dispersed positive electrodes are widely known as layers of positive electrode active material for lithium secondary batteries (also referred to as lithium ion secondary batteries), and are usually produced by kneading and molding particles of lithium complex oxide (typically, lithium-transition metal oxide) and additives, such as binders or conductive agents. Such powder-dispersed positive electrodes contain a relatively large amount (e.g., about 10% by weight) of binder that does not contribute to the capacity of battery, resulting in a low packing density of the positive electrode active material, i.e., lithium complex oxide. Accordingly, the powder-dispersed positive electrode should be greatly improved from the viewpoint of the capacity and charge/discharge efficiency.

Some attempts have been made to improve the capacity and charge/discharge efficiency by positive electrodes or layers of positive electrode active material composed of lithium complex oxide sintered plate. In this case, since the positive electrode or the layer of positive electrode active material contains no binder, high capacity and satisfactory charge/discharge efficiency can be expected due to a high filling density of lithium complex oxide.

For example, PTL 1 (JP5587052B) discloses a positive electrode including a current collector of the positive electrode and a positive electrode active material layer connected to the current collector of the positive electrode with a conductive bonding layer therebetween. The layer of positive electrode active material is composed of a lithium complex oxide sintered plate, and the sintered plate has a thickness of 30 μm or more, a porosity of 3 to 30%, and an open pore rate of 70% or more. In addition, the lithium complex oxide sintered plate has a structure in which a large number of primary grains is bonded, the grains having a grain diameter of 5 μm or less, having a layered rock-salt structure, and exhibiting a ratio [003]/[104] of the diffraction intensity on the (003) plane to the diffraction intensity on the (104) plane in X-ray diffractometry of 2 or less.

PTL 2 (JP5752303B) discloses a lithium complex oxide sintered plate for use in in a positive electrode of a lithium secondary battery, and the lithium complex oxide sintered plate has a thickness of 30 μm or more, a porosity of 3 to 30%, and an open pore rate of 70% or more. In addition, the lithium complex oxide sintered plate has a structure in which a large number of primary grains is bonded, the grains having a grain diameter of 2.2 μm or less, having a layered rock-salt structure, and exhibiting a ratio [003]/[104] of the diffraction intensity on the (003) plane to the diffraction intensity on the (104) plane in X-ray diffractometry of 2 or less.

PTL 3 (JP5703409B) discloses a lithium complex oxide sintered plate for use in in a positive electrode of a lithium secondary battery, and the lithium complex oxide sintered plate has a structure in which a large number of primary grains is bonded, the grains having a grain diameter of 5 μm or less. In addition, the lithium complex oxide sintered plate has a thickness of 30 μm or more, a mean pore diameter of 0.1 to 5 μm, and a porosity of 3% or more to less than 15%. The lithium complex oxide sintered plate also exhibits a ratio [003]/[104] of the diffraction intensity on the (003) plane to the diffraction intensity on the (104) plane in X-ray diffractometry of 2 or less.

All PTLs 1 to 3 have addressed the problem of deterioration in cycle characteristics (capacity retention characteristics when charge/discharge cycles are repeated) in a region having a significantly high filling rate of lithium complex oxide in the sintered plate. In detail, the PTLs have found that the deterioration of cycle characteristics is caused by cracking at grain boundaries in the sintered plate (hereinafter, grain boundary cracking) and separation at the interface between the sintered plate and the conductive bonding layer (hereinafter, bonding interface separation), and solved the above problem through restraining such grain boundary cracking and bonding interface separation.

CITATION LIST

Patent Literature

PTL1: JP5587052B
PTL2: JP5752303B
PTL3: JP5703409B

SUMMARY OF THE INVENTION

Nowadays, miniaturized batteries for smart cards and wearable devices are being increasingly demanded. In order to achieve high capacity and high energy density, use of thick lithium complex oxide sintered plate is advantageous for positive electrodes or layers of positive electrode active material in such miniaturized batteries. In contrast, miniaturized batteries for smart cards and wearable devices require specific performance depending on usage pattern. For example, rapid charge characteristics are desired in batteries used under a situation where users constantly carry them.

The present inventors have now confirmed the following findings: The thick sintered plate having high energy density is prepared through orienting the (003) plane of primary grains at a mean angle of more than 0° to 30° or less to the plate face in the predetermined lithium complex oxide sintered plate. A lithium secondary battery including such a thick lithium complex oxide sintered plate as a positive electrode exhibits high performance, such as rapid charge characteristics.

Accordingly, an object of the present invention is to provide a lithium complex oxide sintered plate having large thickness, the sintered plate being capable of exhibiting high performance, such as rapid charge characteristics while having high energy density when incorporated as a positive electrode into a lithium secondary battery.

One embodiment of the present invention provides a lithium complex oxide sintered plate for use in in a positive electrode of a lithium secondary battery. The lithium complex oxide sintered plate has a structure in which a plurality of primary grains having a layered rock-salt structure are bonded, and has a porosity of 3 to 40%, a mean pore diameter of 15 µm or less, an open pore rate of 70% or more, and a thickness of 15 to 200 µm. The plurality of primary grains have a primary grain diameter, i.e., a mean diameter of the grains, of 20 µm or less and a mean tilt angle of more than 0° to 30° or less, the mean tilt angle being an mean value of the angles defined by the (003) planes of the plurality of primary grains and the plate face of the lithium complex oxide sintered plate.

DETAILED DESCRIPTION OF THE INVENTION

Definition

Figure 1:
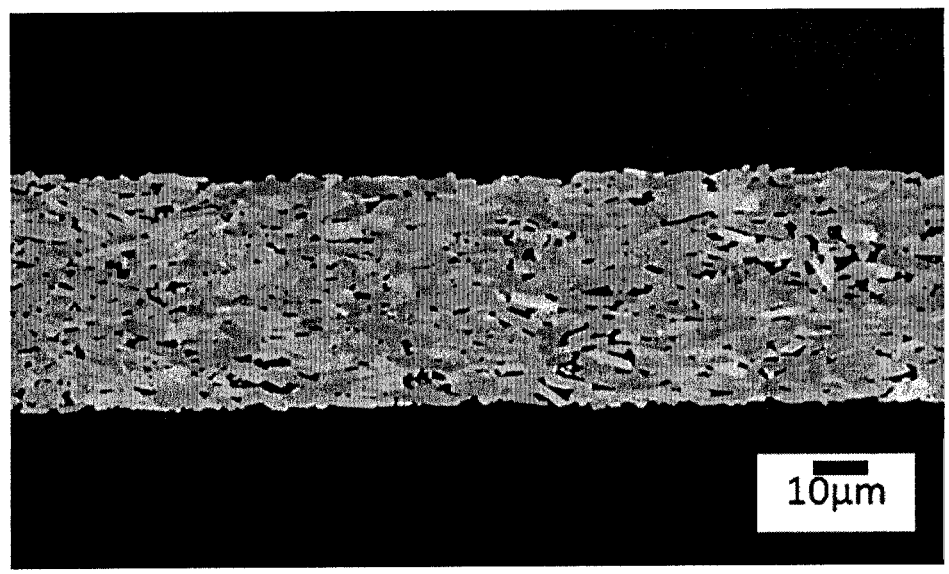
FIG. 1 is a SEM image of an example polished cross-section (a cross-section perpendicular to the plate face) of a lithium complex oxide sintered plate produced in Example 1.

The definitions of the parameters are given below for specifying the present invention.

In the present specification, the term "porosity" refers to the volume rate of pores (including open pores and closed pores) in a lithium complex oxide sintered plate. The porosity can be measured by analysis of a cross-sectional SEM image of the sintered plate. For example, the sintered plate is processed with a cross-section polisher (CP) to expose a polished cross-section. The polished cross-section is observed with a SEM (scanning electron microscope) at a predetermined magnification (for example, 1000 folds) and a predetermined field of view (for example, 125 µm×125 µm). The resulting SEM image is analyzed to divide the total area of all pores in the field of view by the whole area (cross-sectional area) of the sintered plate in the field of view, and the resultant value is multiplied by 100 to give the porosity (%).

In the present specification, the term "mean pore diameter" refers to the mean value of the diameters of pores contained in the lithium complex oxide sintered plate. The "diameter" typically corresponds to the diameter of the spheres if the pores have a spherical form that have the same volume or the same cross-sectional area. In the present invention, the "mean value" is appropriately calculated on the basis of the number. Such a mean pore diameter can be given by a widely known method, such as an image processing process of a cross-sectional SEM (scanning electron microscope) photograph and a mercury intrusion process. Preferably, the mean pore diameter may be measured by the mercury intrusion process with a mercury porosimeter.

In the present specification, the term "open pore rate" refers to the volume rate (vol %) of open pores to all the pores (including open pores and closed pores) contained in the lithium complex oxide sintered plate. The "open pores" refer to pores that are in communication with the outside of the sintered plate among all pores contained in the sintered plate. The "closed pores" refers to the pores that are not in communication with the outside of the sintered plate among all pores contained in the sintered plate. The open pore rate can be calculated from the total porosity corresponding to the sum of open and closed pores based on the bulk density, and the closed porosity corresponding to closed pores based on the apparent density. The parameters used for calculation of the open pore rate may be measured by, for example, the Archimedes method. For example, the closed porosity (vol %) can be determined from the apparent density measured by the Archimedes method, and the total porosity (vol %) can be determined from the bulk density measured by the Archimedes method. Accordingly, the open pore rate can be determined from the closed porosity and the total porosity by the following expression.

$$\begin{aligned}(\text{open pore rate}) &= (\text{open porosity})/(\text{total porosity}) \\ &= (\text{open porosity})/[(\text{open porosity}) + (\text{closed porosity})] \\ &= [(\text{total porosity}) - (\text{closed porosity})]/ \\ &\quad (\text{total porosity})\end{aligned}$$

In the present specification, the term "primary grain diameter" refers to the mean grain diameter of the primary grains in the lithium complex oxide sintered plate. The primary grain diameter can be measured by analysis of a cross-sectional SEM image of the sintered plate. For example, the sintered plate is processed with a cross section polisher (CP) to expose a polished cross section. The polished cross section is observed by SEM (scanning electron microscopy) at a predetermined magnification (for example, 1000 folds) and a predetermined field of view (for example, 125 µm×125 µm). In this case, the field of view is selected such that 20 or more primary grains are located in this field. In the resultant SEM image, circumscribed circles are drawn for all primary grains and the diameters of circumscribed circles are measured. From this measurement, the mean value of these diameters is defined as the primary grain diameter.

In the present specification, the term "tilt angle of primary grain" refers to an angle defined by the (003) planes of the primary grains and the face of the lithium complex oxide sintered plate. The tilt angle of the primary grain can be measured through analysis of the cross-section of the sintered plate by electron back scattering diffractometry (EBSD). For example, the sintered plate is processed with a cross-section polisher (CP) to expose a polished cross section. The polished cross section is analyzed by electron back scattering diffractometry (EBSD) at a predetermined magnification (for example, 1000 folds) and a predetermined field of view (for example, 125 µm×125 µm). In the EBSD image, the tilt angle of each primary grain is represented with a gray scale, and darker shading indicates a smaller tilt angle. Such analysis can determine the tilt angle of each primary grain. In the present specification, the term "mean tilt angle of primary grains" refers to the mean value of angles defined by the (003) planes of the primary grains and the plate face of the lithium complex oxide sintered plate, and can be determined by calculating the rate (%) of the area of the grains included in the range of 0° to 30° from the (003) plane to the area of all the grains in an EBSD image at a predetermined magnification (e.g., 1000 folds) and a predetermined field of view (e.g., 125 µm×125 µm).

In the present specification, the term "mean pore aspect ratio" refers to the mean value of the aspect ratios of pores contained in the lithium complex oxide sintered plate. The aspect ratio of the pore indicates the ratio of the longitudinal length to the lateral length of the pore. The mean pore aspect ratio can be measured by an image analysis of a cross-sectional SEM image of the sintered plate. For example, the sintered plate is processed with a cross section polisher (CP) to expose a polished cross section. The polished cross section is observed by scanning electron microscopy (SEM) at a predetermined magnification (for example, 1000 folds) and a predetermined field of view (for example, 125 μm×125 μm). The resultant SEM image is binarized with image analysis software to identify the pores. The aspect ratio is calculated by dividing the longitudinal length by the lateral length of each identified pore. The aspect ratios of all pores in the binary image are calculated to determine the mean aspect ratio.

Lithium Complex Oxide Sintered Plate

The lithium complex oxide sintered plate according to the present invention is used in a positive electrode of a lithium secondary battery. The lithium complex oxide sintered plate has a structure in which a plurality of primary grains having a layered rock-salt structure is bonded. The lithium complex oxide sintered plate has a porosity of 3 to 40%, a mean pore diameter of 15 μm or less, an open pore rate of 70% or more, a thickness of 15 to 200 μm, and a primary grain diameter of 20 μm or less, which is the mean grain diameter of the primary grains. In addition, the lithium complex oxide sintered plate has a mean tilt angle of the primary grains of more than 0° to 30° or less. In this manner, the predetermined sintered plates of lithium complex oxide are oriented at a mean tilt angle of more than 0° to 30° or less to the plate face, and thereby the lithium complex oxide sintered plate having a large thickness can be provided exhibiting high performance, such as rapid charge characteristics while having high energy density when incorporated as a positive electrode in a lithium secondary battery.

As described above, in order to achieve high capacity and high energy density, use of thick lithium complex oxide sintered plate is advantageous for positive electrodes or layers of positive electrode active material in such miniaturized batteries. In contrast, miniaturized batteries for smart cards and wearable devices require specific performance depending on usage pattern. For example, rapid charge characteristics are desired in batteries used under a situation where users constantly carry them. However, it has been found that a liquid-base high energy density battery (thin lithium battery) including a thick conventional positive electrode plate of lithium complex oxide in combination with an organic electrolytic solution or an ionic liquid exhibits a reduction in capacity retention in charge/discharge cycle test at a high rate (2 C). In this respect, the lithium complex oxide sintered plate having the above structure in the present invention can prevent or reduce deterioration of the battery performance even in a cycle test at a high rate. Although the reason is not clear, it is believed that the stress which may occur by expansion and contraction during charge and discharge cycles is advantageously restrained due to, for example, the orientation of the primary grains at the specific mean tilt angle as described above. As a result, the lithium complex oxide sintered plate in the present invention is believed to exhibit high performance, such as rapid charge characteristics, when incorporated as a positive electrode into a lithium secondary battery while having high energy density due to large thickness of the plate.

In particular, the (003) plane impedes the intercalation and deintercalation of lithium ions in the lithium complex oxide having a layered rock-salt structure. Accordingly, tilting of such (003) plane within 30° or less at a mean value to the plate face, namely, approaching to a parallel direction, indicates that the migration distance of lithium ions gets greatly longer from one side to the other side of the sintered plate used as the positive electrode. Nevertheless, the result that the sintered plate of the present invention provides high battery performance, such as rapid charge performance, is entirely surprising finding beyond expectation.

The lithium complex oxide sintered plate has a structure that a plurality of (namely, a large number of) primary grains is bonded having a layered rock-salt structure. Accordingly, these primary grains are composed of a lithium complex oxide having a layered rock-salt structure. The lithium complex oxide is an oxide represented as typically $Li_xMO_2$ (0.05<x<1.10, M includes at least one transition metal, for example, one or more selected from Co, Ni and Mn). Typical lithium complex oxides have a layered rock-salt structure. The layered rock-salt structure refers to a crystalline structure that lithium layers and transition metal layers other than lithium are alternately stacked with oxygen layers interposed therebetween. That is, the layered rock-salt structure is a crystalline structure that transition metal ion layers and single lithium layers are alternately stacked with oxide ions therebetween (typically, an $\alpha$-$NaFeO_2$ structure: a cubic rock-salt structure in which transition metal and lithium are regularly disposed in the [111] axis direction).

Preferred examples of the lithium complex oxide having a layered rock-salt structure include, preferably lithium cobaltate $Li_pCoO_2$ (wherein, $1 \le p \le 1.1$), lithium nickelate $LiNiO_2$, lithium manganate $Li_2MnO_3$, lithium nickel manganate $Li_{0.5}(Ni_{0.5},Mn_{0.5})O_2$, a solid solution represented by the general formula: $Li_p(Co_x,Ni_y,Mn_z)O_2$ (wherein, $0.97 \le p \le 1.07$, x+y+z=1), a solid solution represented by the general formula: $Li_p(Co_x,Ni_y,Al_z)O_2$ (wherein, $0.97 \le p \le 1.07$, x+y+z=1, $0<x \le 0.25$, $0.6 \le y \le 0.9$, and $0<z \le 0.1$), and a solid solution of $Li_2MnO_3$ and $LiMO_2$ (M is a transition metal, such as Co and Ni), and particularly preferably lithium cobaltate $Li_pCoO_2$ (wherein, $1 \le p \le 1.1$), for example, $LiCoO_2$. The lithium complex oxide sintered plate may further include one or more elements of Mg, Al, Si, Ca, Ti, V, Cr, Fe, Cu, Zn, Ga, Ge, Sr, Y, Zr, Nb, Mo, Ag, Sn, Sb, Te, Ba and Bi.

The primary grain diameter, which is the mean grain diameter of the plurality of primary grains constituting the lithium complex oxide sintered plate, is 20 μm or less, preferably 15 μm or less. In general, as the primary grain diameter decreases, the number of grain boundaries increases. As the number of grain boundaries increases, the internal stress generated in the expansion and contraction of the crystalline lattice accompanying the charge and discharge cycles is appropriately dispersed. In addition, even when cracking occurs, a larger number of grain boundaries blocks the growth of cracks. In contrast, grains of the sintered plate in the present invention are highly orientated, and thereby the stress is not readily concentrated to the grain boundaries, resulting in high cycle characteristics even at large grain diameters. In addition, in the case that the grain diameters are large, the diffusion of lithium during charge and discharge cycles is less likely to be blocked at grain boundaries, which is suitable for rapid charge/discharge. The primary grain diameter is typically 0.2 μm or more, more typically 0.4 μm or more.

The mean tilt angle of the plurality of primary grains in the lithium complex oxide sintered plate (i.e., the mean value of the angles defined by the (003) planes and the plate face) is more than 0° to 30° or less, preferably 5° to 28°, more preferably 10° to 25°. In addition, the rate of individual primary grains having a tilt angle (i.e., an angle defined by the (003) planes and the plate face) of 0° to 30° among all the primary grains in the lithium complex oxide sintered plate is preferably 60% or more, more preferably 80% or more, and further more preferably 90% or more. The upper limit may be any value, for example, may be 100%. The rate of primary grains having a tilt angle of 0° to 30° is typically 80% or less, and more typically 60% or less. It is believed that the above range can more advantageously disperse the stress during charge and discharge cycles, resulting in a further improvement in rapid charge characteristics.

The lithium complex oxide sintered plate includes pores. The pores included in the sintered plate appropriately or uniformly release the stress occurring by expansion and contraction of the crystalline lattice accompanying the intercalation and deintercalation of lithium ions during the charge/discharge cycles. In this mechanism, the grain boundary cracking during repetition of charge/discharge cycles is effectively restrained. In addition, the pores (open pores) in the interface on the conductive bonding layer can increase the bonding strength. The separation at the above bonding interface is appropriately restrained, the separation resulting from the deformation of the lithium complex oxide sintered plate due to the expansion and contraction of the crystalline lattice accompanying the intercalation and deintercalation of lithium ions during charge/discharge cycles. As a result, the capacity can be increased while retaining satisfactory cycle characteristics.

The open pore rate of the lithium complex oxide sintered plate is 70% or more, more preferably 80% or more, and further more preferably 90% or more. The open pore rate may be 100%, typically 90% or less, more typically 80% or less. An open pore rate of 70% or more may more readily release the stress and effectively restrain the cracking at grain boundaries. This effect is likely to be caused by the following reasons. The expansion and contraction of the volume in the positive electrode are caused by the intercalation and deintercalation of lithium ions in the crystalline lattice as described above. The open pore is surrounded by the faces through which lithium ions intercalate and deintercalate. In this configuration, open pores are probably more effective in relieving stress than closed pores. An open pore rate of 70% or more can effectively restrain the separation at bonding interfaces. This advantage is believed to be based on high bonding strength due to an anchor effect caused by an increase in surface roughness by the incorporated open pores, as the open pores can be regarded as affecting surface roughness. In addition, the electrolyte and the conductive material contained in the open pores allows the inner walls of the open pores to effectively serve as surfaces through which lithium ions intercalate and deintercalate. An open pore rate of 70% or more can accordingly improve the rate characteristic as compared with a high closed pore rate in which many closed pores are present as mere pores (portions which do not contribute to charge/discharge).

Although the pores have any distribution pattern and any shape, the pores have a preferred distribution pattern and shape, because the grains composing the lithium complex oxide sintered plate typically have a uniform orientation and a predetermined aspect ratio. For example, the pores may be oriented so as to be in contact with the lithium ion conductive surface, or may have a shape that can be widely in contact with the lithium ion conductive surface (such as spherical or indefinite shape), or may be preferably a configuration having an aspect ratio that provides such an orientation and shape. In the case that the pores have such an aspect ratio, the pore shape having anisotropy defined by the aspect ratio can probably achieve superior performance, such as high flexibility and rapid charge performance, by appropriately dispersing the stress when the battery is warped, charged or discharged.

The lithium complex oxide sintered plate has a porosity of 3 to 40%, more preferably 5 to 35%, further more preferably 7 to 30%, particularly more preferably 10 to 25%. A porosity of less than 3% causes the pore to insufficiently release the stress. A porosity exceeding 40% significantly diminishes the effect of increasing capacity.

The lithium complex oxide sintered plate has a mean pore diameter of 15 µm or less, preferably 12 µm or less, more preferably 10 µm or less. A mean pore diameter exceeding 15 µm leads to generation of relatively large pores. Such large pores usually do not have an exact spherical shape, but have irregular shapes. In such irregular shapes, the stress concentration is likely to occur at local sites in large pores. Accordingly, the stress cannot be uniformly released in the sintered plate. Although the lower limit of the mean pore diameter may be any value, the mean pore diameter is preferably 0.1 µm or more, and more preferably 0.3 µm or more from the viewpoint of the stress relief effect in the pores. As a result, the above range appropriately restrains the cracking at grain boundaries and separation at bonding interfaces.

The lithium complex oxide sintered plate has a thickness of 15 to 200 µm, preferably 30 to 150 µm, more preferably 50 to 100 µm. As described above, the lithium complex oxide sintered plate having larger thickness can lead to higher capacity and higher energy density. The thickness of the lithium complex oxide sintered plate is determined by measuring the distance between the two substantially parallel faces of the plate, for example, when the cross section of the lithium complex oxide sintered plate is observed by SEM (scanning electron microscopy).

Process

The lithium complex oxide sintered plate in the present invention may be produced by any method, and preferably produced through (a) preparation of a green sheet containing a lithium complex oxide, (b) preparation of a green sheet containing an excess-lithium source, and (c) laminating and firing of these green sheets.

(a) Preparation of Green Sheet Containing Lithium Complex Oxide

A raw material powder composed of lithium complex oxide is prepared. The powder preferably comprises pre-synthesized platy particles (e.g., $LiCoO_2$ platy particles) having a composition of $LiMO_2$ (M as described above). The volume-based D50 particle diameter of the raw material powder is preferably 0.3 to 30 µm. For example, the $LiCoO_2$ platy particles can be produced as follows. $Co_3O_4$ powder and $Li_2CO_3$ powder as raw materials are mixed and fired (500 to 900° C., 1 to 20 hours) to synthesize $LiCoO_2$ powder. The resultant $LiCoO_2$ powder is pulverized into a volume-based D50 particle diameter of 0.2 µm to 10 µm with a pot mill to yield platy $LiCoO_2$ particles capable of conducting lithium ions along the faces of the plate. Such $LiCoO_2$ particles are also produced by a procedure involving grain growth in a green sheet from $LiCoO_2$ powder slurry and disintegration of the green sheet, or a procedure involving synthesis of platy crystals, such as a flux process, a hydrothermal synthesis process, a single crystal growth process using a melt, and a sol gel process. The resultant $LiCoO_2$ particles are readily cleaved along cleavage planes. The $LiCoO_2$ particles may be cleaved by crushing to produce $LiCoO_2$ platy particles.

The platy particles may be independently used as raw material powder, or a mixed powder of the platy powder and another raw material powder (for example, $Co_3O_4$ particles) may be used as a raw material powder. In the latter case, it is preferred that the platy powder serves as template particles for providing orientation, and another raw material powder (e.g., $Co_3O_4$ particles) serves as matrix particles that can grow along the template particle. In this case, the raw powder is preferably composed of a mixed powder in a ratio of template particles to matrix particles of 100:0 to 3:97. When the $Co_3O_4$ raw material powder is used as the matrix particles, the volume-based D50 particle diameter of the $Co_3O_4$ raw material powder may be any value, for example, 0.1 to 1.0 μm, and is preferably smaller than the volume-based D50 particle diameter of $LiCoO_2$ template particles. The matrix particles may also be produced by heating the $Co(OH)_2$ raw material at 500° C. to 800° C. for 1 to 10 hours. In addition to $Co_3O_4$, $Co(OH)_2$ particles may be used, or $LiCoO_2$ particles may be used as matrix particles.

When the raw material powder is composed of 100% of $LiCoO_2$ template particles, or when $LiCoO_2$ particles are used as matrix particles, a large (e.g., 90 mm×90 mm square) flat sintered $LiCoO_2$ plate can be yielded by firing. Although the mechanism is not clear, since synthesis of $LiCoO_2$ does not proceed in a firing process, a change in volume or local unevenness of the shape probably does not occur.

The raw material powder is mixed with a dispersive medium and any additive (e.g., binder, plasticizer, and dispersant) to form a slurry. A lithium compound (e.g., lithium carbonate) in an excess amount of about 0.5 to 30 mol % other than $LiMO_2$ may be added to the slurry to promote grain growth and compensate for a volatile component in a firing process described later. The slurry preferably contains no pore-forming agent. The slurry is defoamed by stirring under reduced pressure, and the viscosity is preferably adjusted into 4000 to 10000 cP. The resultant slurry is molded into a sheet to give a green sheet containing lithium complex oxide. The resultant green sheet is in a form of independent sheet. An independent sheet (also referred to as a "self-supported film") refers to a sheet (including flakes having an aspect ratio of 5 or more) that can be independently handled in a singular form apart from other supports. In other words, the independent sheet is not the one that is fixed to a support (such as a substrate) and integrated with the support (so as to be inseparable or hard to separate). The sheet is preferably formed by a procedure capable of applying a shear force to platy particles (for example, template particles) in the raw material powder. Through this process, the primary particles can have a mean tilt angle of more than 0° to 30° or less to the plate face. The procedure capable of applying a shear force to platy particles suitably includes a doctor blade process. The thickness of the green sheet containing the lithium complex oxide may be appropriately selected so as to give the above desired thickness after firing.

(b) Preparation of Green Sheet Containing Excess-Lithium Source

Besides the above green sheet containing lithium complex oxide, another green sheet containing an excess-lithium source is then prepared. The excess-lithium source is preferably a lithium compound other than $LiMO_2$. The components other than Li in the compound evaporate during firing. A preferred example of such a lithium compound (an excess-lithium source) is lithium carbonate. The excess-lithium source is preferably powder, and has a volume-based D50 particle diameter of preferably 0.1 to 20 μm, more preferably 0.3 to 10 μm. The lithium source powder is mixed with a dispersive medium and additives (e.g., a binder, a plasticizer, and a dispersant) to form a slurry. The resulting slurry is defoamed by stirring under reduced pressure, and the viscosity is preferably adjusted into 1000 to 20000 cP. The slurry is molded into a green sheet containing an excess-lithium source. The resultant green sheet is also in a form of independent sheet. The sheet can be formed by any known process, and preferably formed by a doctor blade process. The thickness of the green sheet containing the excess-lithium source is appropriately selected, such that the molar ratio (Li/Co ratio) of the Li content in the green sheet containing the excess-lithium source to the Co content in the green sheet containing the lithium complex oxide is preferably 0.1 or more, more preferably 0.1 to 1.1.

(c) Lamination and Firing of Green Sheets

The green sheet containing the lithium complex oxide (e.g., $LiCoO_2$ green sheet) and the green sheet containing the excess-lithium source (e.g., $Li_2CO_3$ green sheet) are sequentially disposed on a bottom setter, and a top setter is disposed on the green sheets. The top and bottom setters are made of ceramic, preferably zirconia or magnesia. If the setters are made of magnesia, the pores tend to get smaller. The top setter may have a porous structure, a honeycomb structure, or a dense structure. If the top setter has a dense structure, the pores in the sintered plate readily get smaller, and the number of pores tends to get larger. As necessary, the green sheet containing the excess-lithium source is preferably cut into a size, such that the molar ratio (Li/Co ratio) of the Li content in the green sheet containing the excess-lithium source to the Co content in the green sheet containing the lithium complex oxide is preferably 0.1 or more, more preferably 0.1 to 1.1.

After the green sheet containing the lithium complex oxide (e.g., a $LiCoO_2$ green sheet) is placed on the bottom setter, the green sheet may be optionally degreased and then calcined at 600 to 850° C. for 1 to 10 hours. In this step, the green sheet containing the excess-lithium source (e.g., a $Li_2CO_3$ green sheet) and the top setter may be sequentially disposed on the resultant calcined plate.

The green sheets and/or the calcined plate disposed between the setters are optionally degreased and heated (fired) in a medium temperature range (e.g., 700 to 1000° C.) to give a lithium complex oxide sintered plate. This firing process may be performed in one or two steps. In the case of firing in two separate steps, the temperature in the first firing step is preferably lower than that in the second firing step. The resultant sintered plate is also in a form of independent sheet.

(d) Summary

The preferred process described above has the following features or differences from the known methods described in PTLs 1 to 3, and these features or differences are believed to contribute to various characteristics in the lithium complex oxide sintered plate of the present invention.

1) Employment of one-stage process: PTLs 1 to 3 disclose an one-stage process consisting of a first stage involving production of a lithium-containing fired body in a single firing stage without formation of an intermediate fired body, and a two-stage process involving production of a lithium-free intermediate fired body and then introduction of lithium (heat treatment or second firing). In contrast, the preferred process involves the one-stage process.

2) Use of raw material powder of lithium complex oxide: The preferred process uses pre-synthesized platy particles (e.g., LiCoO$_2$ platy particles) having a composition LiMO$_2$ (M is as described above) instead of appropriately mixed particles of compounds composed of, for example, Li and Co. In particular, the mean tilt angle of the primary particles can be controlled at more than 0° and 30° or less to the plate face by forming a sheet using a molding process capable of applying shearing force to the raw material powder containing platy particles.

3) Excess use of Li (excess amount: 30 mol % or more): An excess amount of lithium can be present during firing by the use of a green sheet containing an excess-lithium source (an external excess-lithium source) and an excess-lithium source in the green sheet containing the lithium complex oxide (an internal excess-lithium source), resulting in desirably adjusting the porosity even during firing in a medium temperature range. The external excess-lithium source tends to reduce the porosity, while the internal excess-lithium source tends to increase the porosity and the mean pore diameter.

4) Firing in a medium temperature range: Firing in a medium temperature range (e.g., 700 to 1000° C.) causes fine pores to readily remain.

5) Particle diameter distribution of raw material: In the preferred process using no pore-forming agent, more voids are formed between the particles compared to a process using a pore-forming agent, resulting in a wider pore diameter distribution.

6) Setter layout in firing: Firing of the laminated green sheets interposed between two setters enables fine pores to readily remain.

When a laminate battery is manufactured with the sintered plate of the present invention as a positive electrode plate, the sintered plate may be optionally attached to a laminate current collector to improve the contact with the current collector or to avoid the movement of the positive electrode plate inside the battery.

In addition, an electrolytic solution may contain one or more selected from γ-butyrolactone, propylene carbonate, and ethylene carbonate in an amount of 96% by volume or more. Such an electrolytic solution can be used to operate the battery at high temperature, and stably manufacture a battery without deterioration of the battery in manufacturing at high temperature. In particular, in the case that the electrolytic solution contains no ethylene carbonate or at most 20% by volume ethylene carbonate, a ceramic plate of, for example, Li$_4$Ti$_5$O$_{12}$ (LTO), Nb$_2$TiO$_7$, and TiO$_2$, can be suitably employed as a negative electrode material.

In particular, a laminate battery manufactured with the lithium complex oxide sintered plate in the present invention as a positive electrode plate is characterized in that no binder represented by polyvinylidene fluoride (PVDF) is contained, unlike general coated electrodes. Accordingly, an electrolytic solution containing γ-butyrolactone, which has high heat resistance, can be employed in the laminate battery, because the battery contains no binder represented by PVDF, which is decomposed at high temperature (e.g., 80° C. or more). As a result, the battery can be advantageously operated at a high temperature, and manufactured through a high temperature process at about 120° C.

Any negative electrode commonly used in a lithium secondary battery can be employed in the laminate battery manufactured with the lithium complex oxide sintered plate in the present invention as a positive electrode plate. Examples of such common negative electrode materials include carbonaceous materials, metals and metalloids, such as Li, In, Al, Sn, Sb, Bi, and Si, and alloys containing these metals and metalloids. In addition, an oxide-based negative electrode, such as lithium titanate (Li$_4$Ti$_5$O$_{12}$), may be used. The oxide-based negative electrode may be prepared by mixing and coating a negative electrode active material, such as lithium titanate, with a binder and a conductive aid, and may be a ceramic plate prepared by sintering a negative electrode active material, such as lithium titanate. In the latter case, the ceramic plate may be dense or may have open pores inside the plate. The use of lithium titanate as the negative electrode layer has an advantage in that the reliability and power output performance are greatly improved as compared with the use of carbonaceous material. In addition, the lithium secondary battery manufactured with a negative electrode of lithium titanate and the lithium complex oxide sintered plate in the present invention exhibits high reliability, such as high cycle performance and high storage performance (less self-discharge), and thereby can be used in series by simple control.

TiO$_2$ or Nb$_2$TiO$_7$ may be used as the negative electrode active material. In this case, the negative electrode material may be prepared by coating of a mixture of the above negative electrode active material, a binder and a conductive aid, or may be a ceramic plate prepared by sintering the negative electrode active material. In the latter case, the ceramic plate may be dense or may have open pores inside the plate. The use of these materials as the negative electrode layer has an advantage in that the reliability and power output performance are more greatly improved as compared with the use of a carbonaceous material, and also an advantage in that the energy density is higher than the use of lithium titanate material. The use of these materials as the negative electrode layer can exhibit high reliability, such as high cycle performance and high storage performance similar to the use of lithium titanate, and can be readily used in series.

Alternatively, a carbonaceous material may be used as a negative electrode active material. In this case, the mixture layer of negative electrode composed of the carbonaceous material, a binder, and an optional conductive aid has a density (=total mass of the negative electrode mixture layer)/(volume of the negative electrode mixture layer including pores) of preferably 1.15 to 1.55 g/cm$^3$, more preferably 1.2 to 1.4 g/cm$^3$, further more preferably 1.25 to 1.35 g/cm$^3$. Such a density range can prevent and restrain the deterioration of the battery even in a cycle test at a high rate.

In addition, in order to prevent precipitation of Li metal on the negative electrode, it is preferred that the capacity A of the negative electrode be higher than the capacity C of the positive electrode, in other words, the C/A ratio be less than 1, per facing area of the positive electrode and that of the negative electrode. The C/A ratio can be readily achieved through appropriate adjustment of the thickness of the negative electrode mixture layer at a constant density of the negative electrode mixture layer, depending on the thickness of the lithium complex oxide sintered plate in the present invention.

Futhermore, according to the 90° direction peeling method in accordance with JIS C5016 (1994) "8.1 peel strength of a conductor" in "Test methods of flexible printed wiring boards", the peel strength of the negative electrode mixture layer measured with a 15 mm wide polyester adhesive tape No. 31 (manufactured by Nitto Denko Corporation) is preferably 2 N/15 mm or more, more preferably 3 N/15 mm or more, further more preferably 4 N/15 mm or more. Such a peel strength range can exhibit high reliability with satisfactory cycle characteristics. The peel strength of the negative electrode mixture layer can be appropriately adjusted by, for example, the molecular weight of the binder, the binder ratio in the negative electrode mixture layer, and the pressure in the pressing process.

EXMPLES

The invention will be illustrated in more detail by the following examples.

Example 1

(1) Production of Positive Electrode Plate
(1a) Preparation of $LiCoO_2$ Green Sheet As shown in Table 1, $LiCoO_2$ raw material powder 1 was prepared and was named powder A. The $LiCoO_2$ powder A (100 parts by weight), a dispersive medium (toluene:2-propanol=1:1) (100 parts by weight), a binder (polyvinyl butyral: Product No. BM-2, manufactured by Sekisui Chemical Co., Ltd.) (10 parts by weight), a plasticizer (di-2-ethylhexyl phthalate (DOP), manufactured by Kurogane Kasei Co., Ltd.) (4 parts by weight), and a dispersant (product name: RHEODOL SP-030, manufactured by Kao Corporation) (2 parts by weight) were mixed. The mixture was defoamed by stirring under reduced pressure to prepare an $LiCoO_2$ slurry with a viscosity of 4000 cP. The viscosity was measured with an LVT viscometer manufactured by Brookfield. The slurry was molded into an $LiCoO_2$ green sheet onto a PET film by a doctor blade process. The dried thickness of the $LiCoO_2$ green sheet was 60 μm.

(1b) Preparation of $Li_2CO_3$ Green Sheet (Excess-Lithium Source)

$Li_2CO_3$ raw material powder (volume-based particle diameter D50: 2.5 μm, manufactured by The Honjo Chemical Corporation) (100 parts by weight), a binder (poly(vinyl butyral): Product No. BM-2, manufactured by Sekisui Chemical Co., Ltd.) (5 parts by weight), a plasticizer di-2-ethylhexyl phthalate (DOP), manufactured by Kurogane Kasei Co., Ltd.) (2 parts by weight), and a dispersant (RHEODOL SP-030, manufactured by Kao Corporation) (2 parts by weight) were mixed. The mixture was defoamed by stirring under reduced pressure to prepare a $Li_2CO_3$ slurry with a viscosity of 4000 cP. The viscosity was measured with an LVT viscometer manufactured by Brookfield. The $Li_2CO_3$ slurry was molded into a $Li_2CO_3$ green sheet on a PET film by a doctor blade process. The dried thickness of the $Li_2CO_3$ green sheet was controlled such that the Li/Co molar ratio of the Li content in the $Li_2CO_3$ green sheet to the Co content in the $LiCoO_2$ green sheet had a predetermined value.

(1c) Preparation of Sintered $LiCoO_2$ Plate

The $LiCoO_2$ green sheet was separated from the PET film, and was cut into a 50 mm square. The cut piece was placed on the center of a bottom magnesia setter (dimensions: 90 mm square, height: 1 mm). The $LiCoO_2$ green sheet was heated to 600° C. at a heating rate of 200° C./h, and was degreased for three hours. The $LiCoO_2$ green sheet was then kept at 900° C. for three hours to calcine the $LiCoO_2$ green sheet. The dried $Li_2CO_3$ green sheet was cut into a size such that the Li/Co molar ratio of the Li content in the $Li_2CO_3$ green sheet to the Co content in the calcined $LiCoO_2$ plate was 0.5. The cut piece of the $Li_2CO_3$ green sheet, as an excess-lithium source, was placed on the calcined $LiCoO_2$ plate, and a porous top magnesia setter was placed thereon. The calcined $LiCoO_2$ plate and the green sheet piece disposed between the top and bottom setters were placed into an alumina sheath of a 120 mm square (manufactured by Nikkato Co., Ltd.). At this time, the alumina sheath was not tightly sealed, and was covered with a lid with a gap of 0.5 mm. The laminate was heated to 600° C. at a heating rate of 200° C./h, and was degreased for three hours. The laminate was then heated to 800° C. at 200° C./h, and was kept for five hours. The laminate was then heated to 900° C. at 200° C./h, and was kept for 20 hours to fire. After the firing, the fired laminate was cooled to room temperature, and was removed from the alumina sheath. Thus, the sintered $LiCoO_2$ plate was yielded as a positive electrode plate. The positive electrode plate was shaped with a laser into a square of 9 mm by 9 mm.

(2) Manufacturing of Battery

The positive electrode plate, a separator, and a carbonaceous negative electrode were disposed in sequence to prepare a laminate. The laminate was immersed in an electrolytic solution to manufacture a laminate battery. The electrolytic solution was a solution of $LiPF_6$ (1 mol/L) in equivolume mixed solvent of ethylene carbonate (EC) and diethyl carbonate (DEC). The separator was a 25 μm-thick single-layer membrane made of porous polypropylene (Celgard 2500™, manufactured by Celgard, LLC).

(3) Evaluation

The sintered $LiCoO_2$ plate (positive electrode plate) prepared in Procedure (1c) and the battery manufactured in Procedure (2) were evaluated for various properties as shown below.

<Porosity>

The sintered $LiCoO_2$ plate was polished with a cross section polisher (CP) (IB-15000CP, manufactured by JEOL Ltd.), and the cross-section of the positive electrode plate was observed with SEM (JSM 6390 LA, manufactured by JEOL Ltd.) at a 1000-fold field of view (125 μm×125 μm). The SEM image was subjected to an image analysis, the area of all pores was divided by the area of the positive electrode, and the resultant value was multiplied by 100 to calculate the porosity (%).

<Mean Pore Diameter>

The mean pore diameter of the sintered $LiCoO_2$ plate was measured by a mercury intrusion method using a mercury porosimeter (Autopore IV 9510, manufactured by Shimadzu Corporation).

<Open Pore Rate>

The open pore rate of the sintered $LiCoO_2$ plate was determined by the Archimedes method. In detail, the closed porosity was determined from the apparent density measured by the Archimedes method, and the total porosity was determined from the bulk density measured by the Archimedes method. The open pore rate was then determined from the closed porosity and the total porosity by the following expression:

$$(\text{open pore rate}) = (\text{open porosity})/(\text{total porosity})$$
$$= (\text{open porosity})/[(\text{open porosity}) + (\text{closed porosity})]$$
$$= [(\text{total porosity}) - (\text{closed porosity})]/(\text{total porosity})$$

<Mean Tilt Angle of Primary Grains>

The sintered $LiCoO_2$ plate was polished with a cross section polisher (CP) (IB-15000CP, manufactured by JEOL Ltd.), and the cross-section of the positive electrode plate (cross-section perpendicular to the plate face of the positive electrode plate) was subjected to the EBSD measurement at a 1000-fold field of view (125 μm×125 μm) to give an EBSD image. This EBSD was performed using a Schottky field emission scanning electron microscope (model JSM-7800F, manufactured by JEOL Ltd.). For all grains identified in the resultant EBSD image, the angle defined by the (003) planes of the primary grains and the plate face of the positive electrode plate (that is, the tilt of the crystal orientation from the (003) plane) is determined as a tilt angle. The mean value of the angles was determined as a mean tilt angle of the primary grains.

<Rate of Primary Grains Having Tilt Angle of 0° or More to 30° or Less>

In the EBSD image, the ratio of the total area of primary grains having an tilt angle of 0° to 30° to the total area of the primary grains (that is, the ratio of the area included within the range of 0 to 30° from the (003) plane) was calculated, and the resultant value was determined as a rate (%) of the primary grains having an tilt angle of 0° to 30°.

<Diameter of Primary Grains>

The sintered $LiCoO_2$ plate was polished with a cross section polisher (CP) (IB-15000CP, manufactured by JEOL Ltd.), and the cross-section of the positive electrode plate was observed with SEM (JSM 6390 LA, manufactured by JEOL Ltd.) at a 1000-fold field of view (125 μm×125 μm). At this time, a field of view containing 20 or more primary grains were selected. Circumscribed circles were drawn around all the primary grains in the resultant SEM image to measure the diameters of the circumscribed circles, and a mean value of the diameters was determined as a primary grain diameter.

<Thickness>

The sintered $LiCoO_2$ plate was polished with a cross section polisher (CP) (IB-15000CP, manufactured by JEOL Ltd.), and the resultant cross-section of positive electrode plate was observed with SEM (JSM 6390 LA, manufactured by JEOL Ltd.) to determine a thickness of the positive electrode plate. The thickness of the dried $LiCoO_2$ green sheet described above in Procedure (1a) was also determined in the same manner.

<Capacity Retention After High-Rate Charge/Discharge Cycles (1)>

The capacity retention of a battery after high-rate charge/discharge cycles was measured in the potential range of 4.2 V to 3.0 V by the following procedures.

(i) The battery was charged at a rate of 0.2 C under a constant current until the battery voltage reached 4.2 V, was charged under a constant voltage until the current value reached a rate of 0.02 C, and then was discharged at a rate of 0.2 C until the voltage reached 3.0 V. This charge/discharge cycle was repeated three times in total to measure the discharge capacities. The averaged value was defined as an initial discharge capacity.

(ii) The battery was charged and discharged at a high charge rate of 2 C and a high discharge rate of 2 C fifty times in total.

(iii) The battery was charged at a rate of 0.2 C under a constant current until the battery voltage reached 4.2 V, was charged under a constant voltage until the current reached a rate of 0.02 C, and then was discharged at a rate of 0.2 C until the voltage reached 3.0 V. This charge/discharge cycle was repeated three times in total to measure the discharge capacities. The averaged value was defined as a post-cycle discharge capacity after high-rate charge/discharge cycles.

(iv) The ratio of the post-cycle discharge capacity measured in Procedure (iii) to the initial discharge capacity measured in Procedure (i) was calculated, and the ratio was multiplied by 100 to determine the capacity retention (%) after high-rate charge/discharge cycles.

Example 2

A positive electrode plate and a battery were prepared and evaluated for the various properties as in Example 1 except that 1) degreasing and calcination were not carried out, and 2) the size of the $Li_2CO_3$ green sheet piece to be placed was varied so as to have a Li/Co ratio of 0.4.

Example 3

A positive electrode plate and a battery were prepared and evaluated for the various properties as in Example 2 except that $Li_2CO_3$ raw material powder (a volume-based D50 particle diameter of 2.5 μm, manufactured by Honjo Chemical Co., Ltd.) was further added to the $LiCoO_2$ slurry to have an excess-Li/Co ratio of 0.1 in the $LiCoO_2$ green sheet. The excess-Li/Co ratio is the molar ratio of the excess-Li content derived from $Li_2CO_3$ in the $LiCoO_2$ green sheet to the Co content in the $LiCoO_2$ green sheet.

Example 4

A positive electrode plate and a battery were prepared and evaluated for the various properties as in Example 1 except that 1) powder B corresponding to $LiCoO_2$ raw material powder 3 produced as shown in Table 1 was used instead of powder A, 2) the calcination temperature was 800° C., and 3) the size of the $Li_2CO_3$ green sheet piece to be placed was varied so as to have a Li/Co ratio of 0.4.

Example 5

A positive electrode plate and a battery were prepared and evaluated for the various properties as in Example 1 except that 1) powder C corresponding to $LiCoO_2$ raw material powder 2 produced as shown in Table 1 was used instead of powder A, and 2) the size of the $Li_2CO_3$ green sheet piece to be placed was varied so as to have a Li/Co ratio of 0.4.

Example 6

A positive electrode plate and a battery were prepared and evaluated for the various properties as in Example 1 except that 1) the size of the $Li_2CO_3$ green sheet piece to be placed was varied so as to have a Li/Co ratio of 0.4, and 2) the firing time at 900° C. was 40 hours.

Example 7

A positive electrode plate and a battery were prepared and evaluated for the various properties as in Example 2 except that the $LiCoO_2$ green sheet was molded to have a dried thickness of 20 μm.

Example 8

A positive electrode plate and a battery were prepared and evaluated for the various properties as in Example 2 except that the $LiCoO_2$ green sheet was molded to have a dried thickness of 120 μm.

Example 9

A positive electrode plate and a battery were prepared and evaluated for the various properties as in Example 1 except that 1) the calcination temperature was 700° C. and 2) the size of the $Li_2CO_3$ green sheet piece to be placed was varied so as to have a Li/Co ratio of 0.6.

Example 10

A positive electrode plate and a battery were prepared and evaluated for the various properties as in Example 1 except that 1) the size of the $Li_2CO_3$ green sheet piece to be placed was varied so as to have a Li/Co ratio of 0.4, 2) the firing time at 800° C. was 10 hours, and 3) the firing at 900° C. was not performed.

Example 11

A positive electrode plate and a battery were prepared and evaluated for the various properties as in Example 2 except that 1) $LiCoO_2$—$Co_3O_4$ mixture powder D containing raw material powders 1, 3 and 4 as shown in Table 1 in a ratio of 33:33:34 (by weight) was used instead of powder A, and 2) the size of the $Li_2CO_3$ green sheet piece to be placed was varied so as to have a Li/Co ratio of 1.1.

Example 12

A positive electrode plate and a battery were prepared and evaluated for the various properties as in Example 2 except that $LiCoO_2$—$Co_3O_4$ mixture powder E containing raw material powders 2 and 5 as shown in Table 1 in a ratio of 50:50 (by weight) was used instead of powder A.

Example 13

A positive electrode plate and a battery were prepared and evaluated for the various properties as in Example 1 except that 1) $LiCoO_2$—$Co_3O_4$ mixture powder F containing raw material powders 1, 2 and 5 as shown in Table 1 in a ratio of 50:25:25 (by weight) was used instead of powder A, and 2) the calcination temperature was 800° C.

Example 14

A positive electrode plate and a battery were prepared and evaluated for the various properties as in Example 1 except that 1) $LiCoO_2$—$Co_3O_4$ mixture powder G containing raw material powders 1 and 4 as shown in Table 1 in a ratio of 25:75 (by weight) was used instead of powder A, 2) the calcination temperature was 800° C., and 3) the size of the $Li_2CO_3$ green sheet piece to be placed was varied so as to have a Li/Co ratio of 0.4.

Example 15 (Comparative)

A positive electrode plate and a battery were prepared and evaluated for the various properties as in Example 1 except that 1) $LiCoO_2$—$Co_3O_4$ mixture powder H containing raw material powders 1 and 4 as shown in Table 1 in a ratio of 25:75 (by weight) was used instead of powder A, and 2) the size of the $Li_2CO_3$ green sheet piece to be placed was varied so as to have a Li/Co ratio of 1.2.

Example 16 (Comparative)

A positive electrode plate and a battery were prepared and evaluated for the various properties as in Example 1 except that 1) $Co_3O_4$—$Bi_2O_3$ mixture powder I containing raw material powders 5 and 6 as shown in Table 1 in a ratio of 95:5 (by weight) was used instead of powder A, and thereby a $Co_3O_4$ green sheet containing $Bi_2O_3$ as an aid was used instead of the $LiCoO_2$ green sheet, 2) the size of the $Li_2CO_3$ green sheet piece to be placed was varied so as to have a Li/Co ratio of 1.2, 3) the calcination was performed at 1300° C. for five hours, and 4) main firing was performed at 850° C. for 20 hours in one-stage process, not in two-stage process.

Example 17

A positive electrode plate and a battery were prepared and evaluated for the various properties as in Example 2 except that 1) powder J corresponding to $LiCoO_2$ raw material powder 3 produced as shown in Table 1 was used instead of powder A, 2) the $LiCoO_2$ green sheet was molded to have a dried thickness of 230 μm, 3) $Li_2CO_3$ green sheet piece (excess-lithium source) was not placed, and 4) main firing was performed at 870° C. for 20 hours in one-stage process, not in two-stage process.

Example 18

A positive electrode plate and a battery were prepared and evaluated for the various properties as in Example 2 except that 1) powder J corresponding to $LiCoO_2$ raw material powder 3 produced as shown in Table 1 was used instead of powder A, 2) the $LiCoO_2$ green sheet was molded to have a dried thickness of 120 μm, 3) $Li_2CO_3$ green sheet piece (excess-lithium source) was not placed, 4) main firing was performed at 870° C. for 20 hours in one-stage process, not in two-stage process, and 5) the evaluation of the capacity retention after high-rate charge/discharge cycles was carried out in the following procedures and conditions.

<Capacity Retention after High-Rate Charge/Discharge Cycles (2)>

The capacity retention of each battery after high-rate charge/discharge cycles was measured in a potential range of 4.35 V to 3.0 V by the following procedures.

(i) The battery was charged at a rate of 0.2 C under a constant current until the battery voltage reached 4.35 V, was charged under a constant voltage until the current value reached a rate of 0.02 C, and then was discharged at a rate of 0.2 C until the voltage reached 3.0 V. This charge/discharge cycle was repeated three times in total to measure the discharge capacities. The averaged value was defined as an initial discharge capacity.

(ii) The battery was charged and discharged at a high charge rate of 2 C and a high discharge rate of 2 C fifty times in total.

(iii) The battery was charged at a rate of 0.2 C under a constant current until the battery voltage reached 4.35 V, was charged under a constant voltage until the current value reached a rate of 0.02 C, and then was discharged at a rate of 0.2 C until the voltage reached 3.0 V. This charge/discharge cycle was repeated three times in total to measure the discharge capacities. The averaged value was defined as the post-cycle discharge capacity after high-rate charge/discharge cycles.

(iv) The ratio of the post-cycle discharge capacity measured in Procedure (iii) to the initial discharge capacity measured in Procedure (i) was calculated, and the ratio was multiplied by 100 to determine the capacity retention (%) after high-rate charge/discharge cycles.

As shown in Table 3, a remarkably high capacity retention of 97.0% after high-rate charge/discharge cycles was achieved in operating the battery produced in this Examples in the potential range of 4.35 V to 3.0 V. In other words, the results indicate that, when the lithium complex oxide sintered plate in the present invention is used as a positive electrode plate in a battery, the battery does not deteriorate even during the operation at a voltage exceeding 4.3V (for example 4.35 V) as the maximum voltage. Such a high voltage resistance can be desirably achieved without subjecting the sintered plate in the present invention to a specific treatment, such as Zr coating.

Example 19 (Comparative)

A positive electrode plate and a battery were prepared and evaluated for the various properties as in Example 16 except that 1) the $LiCoO_2$ green sheet was molded into a dried thickness of 120 μm, and 2) the evaluation of the capacity retention after high-rate charge/discharge cycles was carried out in the potential range of 4.35 V to 3.0 V as in Example 18.

Process Conditions and Results of Evaluation

Figure 2:
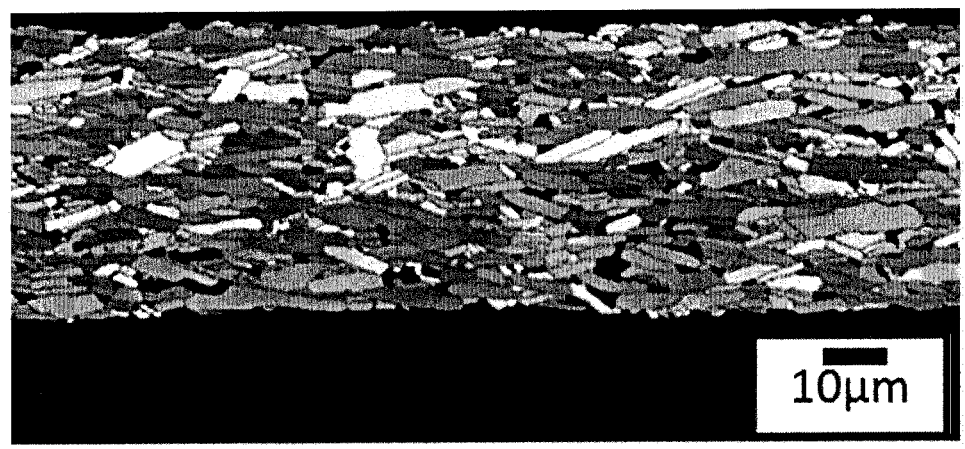
FIG. 2 is a cross-sectional EBSD image of a lithium complex oxide sintered plate produced in Example 1 in the observed area shown in FIG. 1.
Figure 2:
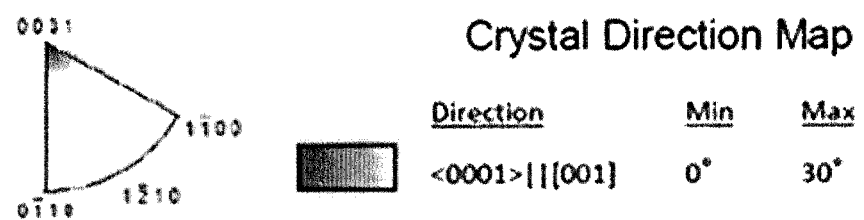

Table 2 shows the process conditions in Examples 1 to 19, and Table 3 shows the results of evaluation in Examples 1 to 19. In addition, Table 1 shows the mixing ratio of the raw material powders 1 to 6 in each of the powders A to J indicated in Table 2. Furthermore, FIG. 1 illustrates a SEM image of the polished cross-section (cross-section perpendicular to the plate face) of the lithium complex oxide sintered plate in Example 1, and FIG. 2 illustrates a cross-sectional EBSD image of the lithium complex oxide sintered plate in Example 1 in the observed region shown in FIG. 1. The particle diameters of the raw material powders shown in Table 1 were measured by a laser diffraction/scattering particle diameter distribution measuring device (Microtrac MT 3000 II, manufactured by MicrotracBell Corpotration).

TABLE 1

| | Raw powder | Proportion of raw material powders in each mixture (weight %) | | | | | | | | | |
|---|---|---|---|---|---|---|---|---|---|---|---|
| | | A | B | C | D | E | F | G | H | I | J |
| 1 | $LiCoO_2$ platy particles produced through mixing $Co_3O_4$ powder (manufactured by Seido Chemical Industry Co., Ltd.) and $Li_2CO_3$ powder (manufactured by The Honjo Chemical Corporation) in a Li/Co molar ratio of 1.02, heating to 750° C., keeping for five hours, and pulverizing the particles into a volume-based D50 of 0.4 μm with a pot mill | 100 | — | — | 33 | — | 50 | 25 | 5 | — | — |
| 2 | $LiCoO_2$ platy particles produced through mixing $Co_3O_4$ powder (manufactured by Seido Chemical Industry Co., Ltd.) and $Li_2CO_3$ powder (manufactured by The Honjo Chemical Corporation) in a Li/Co molar ratio of 1.02, heating to 750° C., keeping for five hours, and pulverizing the particles into a volume-based D50 of 1.0 μm with a pot mill | — | — | 100 | — | 50 | 25 | — | — | — | — |
| 3 | $LiCoO_2$ platy particles produced through mixing $Co_3O_4$ powder (manufactured by Seido Chemical Industry Co., Ltd.) and $Li_2CO_3$ powder (manufactured by The Honjo Chemical Corporation) in a Li/Co molar ratio of 1.02, heating to 600° C., keeping for five hours, and pulverizing the particles into a volume-based D50 of 0.2 μm with a pot mill | — | 100 | — | 33 | — | — | — | — | — | — |
| 4 | $Co_3O_4$ powder produced through heating $Co(OH)_2$ powder (manufactured by Wako Pure Chemical Corporation) to 600° C. and keeping for three hours | — | — | — | 34 | — | — | 75 | 95 | — | — |
| 5 | $Co_3O_4$ powder (manufactured by Seido Chemical Industry Co., Ltd., a volume-based D50 of 0.8 μm) | — | — | — | — | 50 | 25 | — | — | 95 | — |
| 6 | $Bi_2O_3$ powder (a D50 of 0.3 μm) | — | — | — | — | — | — | — | — | 5 | — |
| 7 | $LiCoO_2$ platy particles produced through mixing $Co_3O_4$ powder (manufactured by Seido Chemical Industry Co., Ltd.) and $Li_2CO_3$ powder (manufactured by The Honjo Chemical Corporation) in a Li/Co molar ratio of 1.01, heating to 780° C., keeping for five hours, and pulverizing the particles into a volume-based D50 of 0.4 μm with a pot mill | — | — | — | — | — | — | — | — | — | 100 |

TABLE 2

| | Powder used | Thickness of plate (μm) | Internal excess-litium source Excess-Li/Co ratio corresponding to $Li_2CO_3$ content in $LiCoO_2$ green sheet | External excess-litium source Li/Co ratio corresponding to $Li_2CO_3$ content in $Li_2CO_3$ green sheet | Calcining conditions | Main firing conditions |
|---|---|---|---|---|---|---|
| Ex. 1 | A | 60 | 0 | 0.5 | 900° C. × 3 h | 800° C. × 5 h followed by 900° C. × 20 h |
| Ex. 2 | A | 60 | 0 | 0.4 | — | 800° C. × 5 h followed by 900° C. × 20 h |
| Ex. 3 | A | 60 | 0.1 | 0.4 | — | 800° C. × 5 h followed by 900° C. × 20 h |
| Ex. 4 | B | 60 | 0 | 0.4 | 800° C. × 3 h | 800° C. × 5 h followed by 900° C. × 20 h |
| Ex. 5 | C | 60 | 0 | 0.4 | 900° C. × 3 h | 800° C. × 5 h followed by 900° C. × 40 h |
| Ex. 6 | A | 60 | 0 | 0.4 | 900° C. × 3 h | 800° C. × 5 h followed by 900° C. × 20 h |
| Ex. 7 | A | 20 | 0 | 0.4 | — | 800° C. × 5 h followed by 900° C. × 20 h |
| Ex. 8 | A | 120 | 0 | 0.4 | — | 800° C. × 5 h followed by 900° C. × 20 h |
| Ex. 9 | A | 60 | 0 | 0.6 | 700° C. × 3 h | 800° C. × 5 h followed by 900° C. × 20 h |
| Ex. 10 | A | 60 | 0 | 0.1 | 900° C. × 3 h | 800° C. × 10 h |
| Ex. 11 | D | 60 | 0 | 1.1 | — | 800° C. × 5 h followed by 900° C. × 20 h |
| Ex. 12 | E | 60 | 0 | 0.4 | — | 800° C. × 5 h followed by 900° C. × 20 h |
| Ex. 13 | F | 60 | 0 | 0.5 | 800° C. × 3 h | 800° C. × 5 h followed by 900° C. × 20 h |
| Ex. 14 | G | 60 | 0 | 0.4 | 800° C. × 3 h | 800° C. × 5 h followed by 900° C. × 20 h |
| Ex. 15* | H | 60 | 0 | 1.2 | 900° C. × 3 h | 800° C. × 5 h followed by 900° C. × 20 h |

TABLE 2-continued

|  | Powder used | Thickness of plate (μm) | Internal excess-litium source Excess-Li/Co ratio corresponding to Li$_2$CO$_3$ content in LiCoO$_2$ green sheet | External excess-litium source Li/Co ratio corresponding to Li$_2$CO$_3$ content in Li$_2$CO$_3$ green sheet | Calcining conditions | Main firing conditions |
|---|---|---|---|---|---|---|
| Ex. 16* | I | 60 | 0 | 1.2 | 1300° C. × 5 h | 850° C. × 20 h |
| Ex. 17 | J | 230 | 0 | 0 | — | 870° C. × 20 h |
| Ex. 18 | J | 120 | 0 | 0 | — | 870° C. × 20 h |
| Ex. 19* | I | 120 | 0 | 1.2 | 1300° C. × 5 h | 850° C. × 20 h |

*comparative example

TABLE 3

|  | Porosity (%) | Mean pore diameter (μm) | Open pore rate (%) | Mean tilt angle of primary grains (°) | Rate of primary grains having tilt angle of 0° to 30° (%) | Primary grain diameter (μm) | Thickness of plate (μm) | Capacity retention after high-rate charge/discharge cycles (%) | Potential range to evaluate capacity retention in high-rate charge/discharge cycles |
|---|---|---|---|---|---|---|---|---|---|
| Ex. 1 | 5 | 0.8 | 90 | 16° | 80.0 | 4.0 | 50 | 96.5 | 4.2 V-3.0 V |
| Ex. 2 | 15 | 0.8 | 95 | 16° | 80.0 | 4.0 | 50 | 97.0 |  |
| Ex. 3 | 40 | 0.8 | 95 | 16° | 80.0 | 4.0 | 50 | 97.2 |  |
| Ex. 4 | 15 | 0.1 | 80 | 16° | 80.0 | 4.0 | 50 | 96.0 |  |
| Ex. 5 | 15 | 10.0 | 95 | 16° | 80.0 | 4.0 | 50 | 96.3 |  |
| Ex. 6 | 15 | 0.8 | 70 | 16° | 80.0 | 4.0 | 50 | 96.4 |  |
| Ex. 7 | 15 | 0.8 | 95 | 16° | 80.0 | 4.0 | 15 | 98.0 |  |
| Ex. 8 | 15 | 0.8 | 95 | 16° | 80.0 | 4.0 | 100 | 97.2 |  |
| Ex. 9 | 15 | 0.9 | 95 | 16° | 80.0 | 15.0 | 50 | 96.8 |  |
| Ex. 10 | 15 | 0.6 | 95 | 16° | 80.0 | 0.5 | 50 | 97.2 |  |
| Ex. 11 | 15 | 0.8 | 95 | 8° | 90.0 | 4.0 | 50 | 98.0 |  |
| Ex. 12 | 15 | 0.8 | 95 | 30° | 80.0 | 4.0 | 50 | 96.2 |  |
| Ex. 13 | 15 | 0.8 | 95 | 25° | 60.0 | 4.0 | 50 | 96.0 |  |
| Ex. 14 | 15 | 0.8 | 95 | 12° | 95.0 | 4.0 | 50 | 98.4 |  |
| Ex. 15* | 2 | 0.5 | 30 | 16° | 80.0 | 2.0 | 50 | 20.0 |  |
| Ex. 16* | 1 | 0.3 | 95 | 68° | 10.0 | 1.8 | 50 | 45.0 |  |
| Ex. 17 | 30 | 0.8 | 95 | 16° | 80.0 | 3.8 | 200 | 96.5 |  |
| Ex. 18 | 30 | 0.8 | 95 | 16° | 80.0 | 3.8 | 100 | 97.0 | 4.35 V-3.0 V |
| Ex. 19* | 1 | 0.3 | 95 | 68° | 10.0 | 1.8 | 100 | 20.0 |  |

*comparative example

What is claimed is:

1. A lithium complex oxide sintered plate for use in a positive electrode of a lithium secondary battery, wherein the lithium complex oxide sintered plate includes a first major plate face and a second major plate face that is opposite from and parallel to the first major plate face, a structure in which a plurality of primary grains having a layered rock-salt structure are bonded, and has:

a porosity of 3 to 40%,
a mean pore diameter of 0.1 μm or more and 15 μm or less,
an open pore rate of 70% or more and 95% or less, and
a thickness of 15 to 200 μm,
wherein the primary grains have a primary grain diameter of 0.5 μm or more and 20 μm or less and a mean tilt angle of more than 0° to 30° or less, the primary grain diameter being a mean diameter of the primary grains, the mean tilt angle being a mean value of the angles defined by the (003) planes of the primary grains and one of the first or second major plate faces of the lithium complex oxide sintered plate;

wherein a ratio of individual primary grains having tilt angles of 0° to 30° among all the primary grains is 60% or more, and the tilt angle is defined by the (003) plane of the primary grain and one of the first or second major plate faces of the lithium complex oxide sintered plate; and wherein the sintered plate does not include a binder.

2. The lithium complex oxide sintered plate according to claim 1, wherein the ratio of the individual primary grains having tilt angles of 0° to 30° among all the primary grains is 80% or more.

3. The lithium complex oxide sintered plate according to claim 1, wherein the ratio of the individual primary grains having tilt angles of 0° to 30° among all the plurality of primary grains is 90% or more.

4. The lithium complex oxide sintered plate according to claim 1, having a thickness of 30 to 150 μm.

5. The lithium complex oxide sintered plate according to claim 1, having a thickness of 50 to 100 μm.

* * * * *